United States Patent
Weiss

(10) Patent No.: US 10,258,848 B2
(45) Date of Patent: Apr. 16, 2019

(54) COMPOSITE LACROSSE HANDLE AND METHOD OF MANUFACTURE

(71) Applicant: Warrior Sports, Inc., Warren, MI (US)

(72) Inventor: Scott L. Weiss, Novi, MI (US)

(73) Assignee: Warrior Sports, Inc., Warren, MI (US)

( * ) Notice: Subject to any disclaimer, the term of this patent is extended or adjusted under 35 U.S.C. 154(b) by 120 days.

(21) Appl. No.: 15/073,182

(22) Filed: Mar. 17, 2016

(65) Prior Publication Data

US 2016/0303444 A1    Oct. 20, 2016

Related U.S. Application Data

(60) Provisional application No. 62/149,091, filed on Apr. 17, 2015.

(51) Int. Cl.
| | | |
|---|---|---|
| *A63B 59/20* | (2015.01) | |
| *B29C 45/14* | (2006.01) | |
| *B29C 70/34* | (2006.01) | |
| *B29C 70/72* | (2006.01) | |
| *B29L 31/52* | (2006.01) | |
| *B29K 105/08* | (2006.01) | |
| *B29K 277/00* | (2006.01) | |

(52) U.S. Cl.
CPC ............ *A63B 59/20* (2015.10); *B29C 70/345* (2013.01); *B29C 70/72* (2013.01); *B29C 45/14786* (2013.01); *B29K 2105/08* (2013.01); *B29K 2277/10* (2013.01); *B29L 2031/5245* (2013.01)

(58) Field of Classification Search
CPC ....... A63B 59/20; B29C 70/345; B29C 70/72; B29C 45/14786; B29K 2105/08; B29K 2277/10; B29L 2031/5245
See application file for complete search history.

(56) References Cited

U.S. PATENT DOCUMENTS

| | | | |
|---|---|---|---|
| 6,500,079 B1 * | 12/2002 | Tucker, Sr. ............ | A63B 49/08 473/203 |
| 6,889,405 B2 | 5/2005 | Ritrovato et al. | |
| 7,621,832 B2 | 11/2009 | Morrow et al. | |
| 2005/0277494 A1 | 12/2005 | Goss | |
| 2006/0019777 A1 * | 1/2006 | Rogers ................... | A63B 59/20 473/513 |

(Continued)

*Primary Examiner* — Eugene L Kim
*Assistant Examiner* — Jeffrey S Vanderveen
(74) *Attorney, Agent, or Firm* — Warner Norcross + Judd LLP

(57) ABSTRACT

A composite lacrosse handle configured to join with a lacrosse head is provided including a top end, a bottom end and an intermediate portion located therebetween, all of which are constructed from hardened fiber reinforced plies. The intermediate portion includes a different exterior contour than that of the top and bottom ends. The intermediate portion can be generally recessed relative to the exterior of the top and bottom ends. Within the recess, an overmold or cover of a material, for example a viscoelastic material and/or thermoplastic elastomer can be disposed. The overmold material can follow the contours of the intermediate portion and top and bottom ends, and can vary in thickness from the top end to the bottom end along the intermediate portion. A method of constructing the composite lacrosse handle is also provided including utilizing special mandrels and mold cavities to form the composite handle and overmold the cover element.

20 Claims, 6 Drawing Sheets

(56) References Cited

U.S. PATENT DOCUMENTS

| | | | | |
|---|---|---|---|---|
| 2011/0136602 A1* | 6/2011 | Hsu | ............... | A63B 49/11 |
| | | | | 473/535 |
| 2012/0283052 A1* | 11/2012 | Tucker, Jr. | ........... | B21D 26/033 |
| | | | | 473/513 |

* cited by examiner

COMPOSITE LACROSSE HANDLE AND METHOD OF MANUFACTURE

BACKGROUND OF THE INVENTION

The present invention relates to a composite lacrosse handle and a related method of manufacture.

Conventional lacrosse handles generally have included a hollow tube formed of aluminum, titanium, or other lightweight metal alloys. Lacrosse handles of this construction provide a durable low cost construction that can withstand repeated impacts during play. More recently, lacrosse handles are formed of a fiber material disposed within a matrix material. Such handles are generally termed "composite" handles to distinguish over traditional metal handles. Despite their being somewhat more expensive than comparable metal handles, composite lacrosse handles have gained acceptance in nearly all levels of competition. The advantages of composite lacrosse handles can include a generally lighter feel for a quicker release during passing and shooting motions, as well as improved ball control during play.

Composite handles, however, can be rather slippery, difficult to grip and are not particularly good at absorbing shock and vibration upon impact with another player's handle or equipment. Therefore, users of composite handles can frequently experience excess vibration and shock, which can lead to fatigue and impaired hand grip. When a player's grip is compromised, this can lead to unsatisfactory performance.

Accordingly, there remains room for improvement in the field of lacrosse handles.

SUMMARY OF THE INVENTION

A composite lacrosse handle to be joined with a lacrosse head is provided, including a top end, a bottom end, and an intermediate portion of reduced dimension located therebetween, all of which are constructed from hardened fiber reinforced plies. The intermediate portion and optionally other portions of the handle can be overmolded with a cover constructed from an impact and vibration absorbing material, for example a viscoelastic material.

In one embodiment, the intermediate portion includes a different exterior contour than that of the top and bottom ends. For example, the intermediate portion can be generally of a decreased diameter or dimension relative to the top and bottom ends respective diameters and/or dimensions.

In another embodiment, the intermediate portion can include interfaces that smoothly transition to the increased dimension or diameter of the top and/or bottom ends.

In yet another embodiment, the lacrosse handle can be substantially hollow and can define an internal core. The internal core can be reflected through the exterior of the handle as it transitions from the top end to the bottom end. Optionally, the core can be filled with a foam or other lightweight impact absorbing material.

In still another embodiment, the material disposed within the contours of the intermediate portion can merge smoothly into and generally can be flush with the exterior surfaces at the top and bottom ends of the lacrosse handle.

In a further embodiment, the intermediate portion can include an overmold cover that is directly physically bonded to the exterior surface of the intermediate portion, and optionally its adjacent interfaces.

In yet a further embodiment, a method is provided. The method can include the steps of: providing first and second mandrels, each having a narrowed end and an enlarged end; abutting the narrowed ends adjacent one another; wrapping the mandrels with a strip and/or sheet of fiber reinforced plies; curing the plies to form a cured lacrosse stick in a mold; removing the cured lacrosse handle from the mold; and optionally overmolding the impact absorbing material over the intermediate portion of the lacrosse handle.

The composite lacrosse handle of the current embodiments provides a sturdy, reliable and lightweight lacrosse handle that also is favorably configured to absorb vibrations and deaden impacts with other sticks, equipment and/or objects.

These and other advantages and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
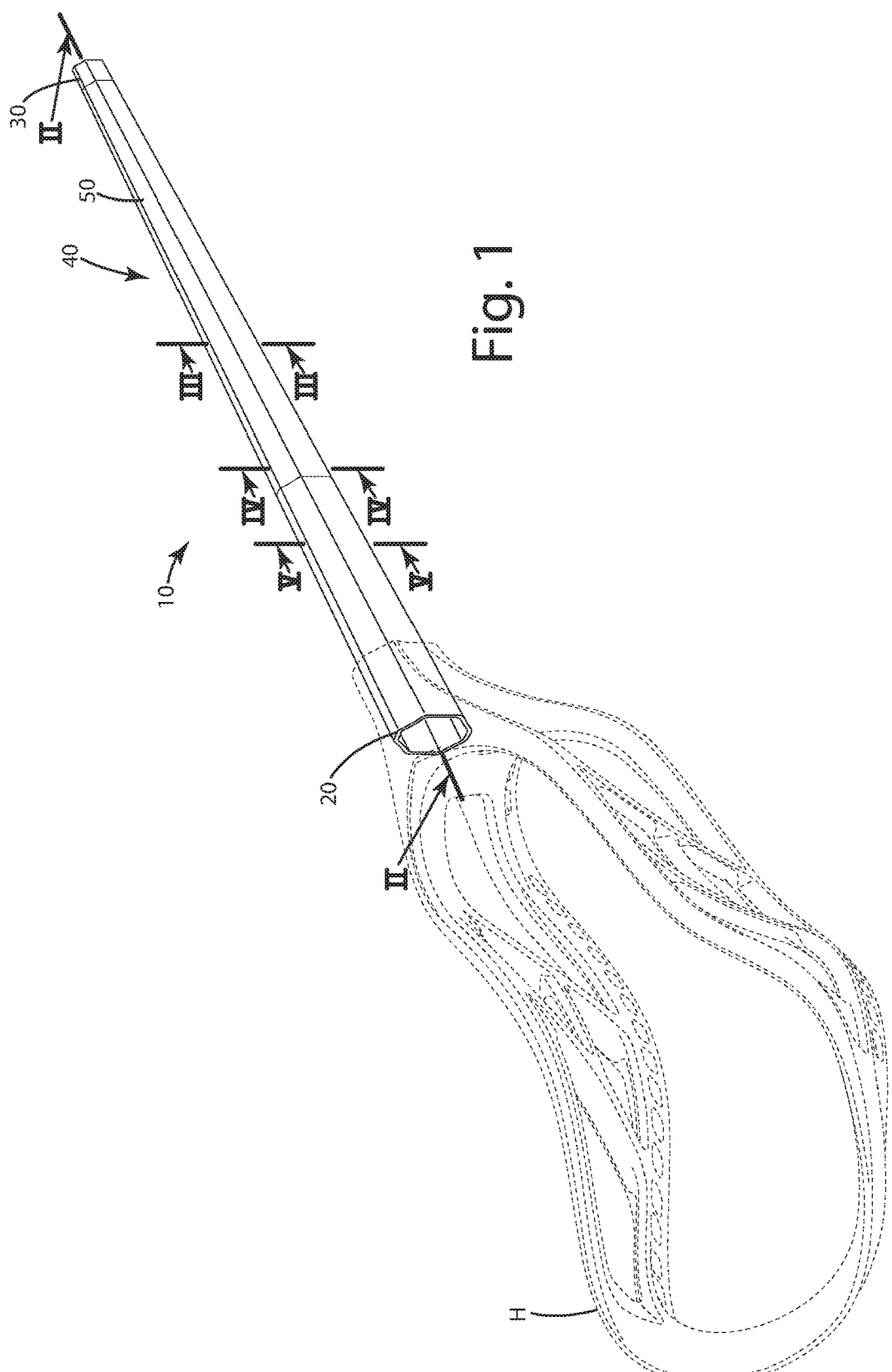
FIG. 1 is a perspective view of a composite lacrosse handle of a current embodiment attached to a lacrosse head.
Figure 2:
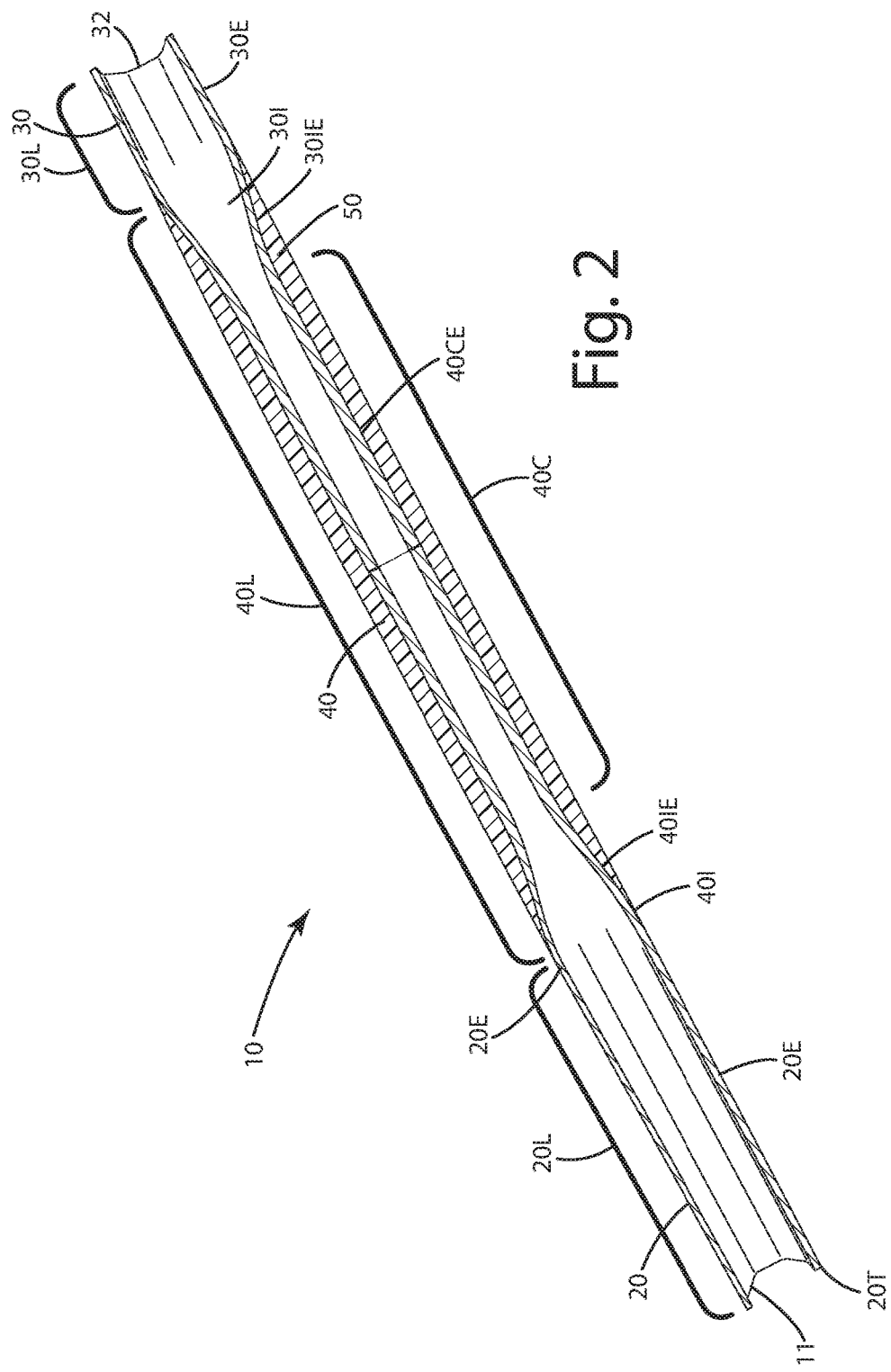
FIG. 2 is a cross section view of the composite lacrosse handle taken along lines 2-2 of FIG. 1.
Figure 3:
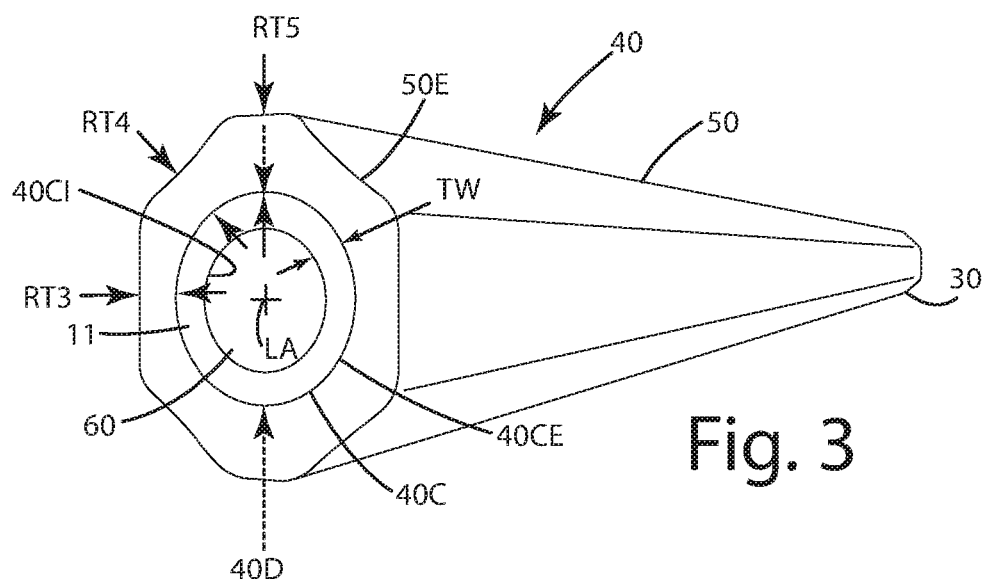
FIG. 3 is a section view of the composite lacrosse handle taken along lines 3-3 of FIG. 1
Figure 4:
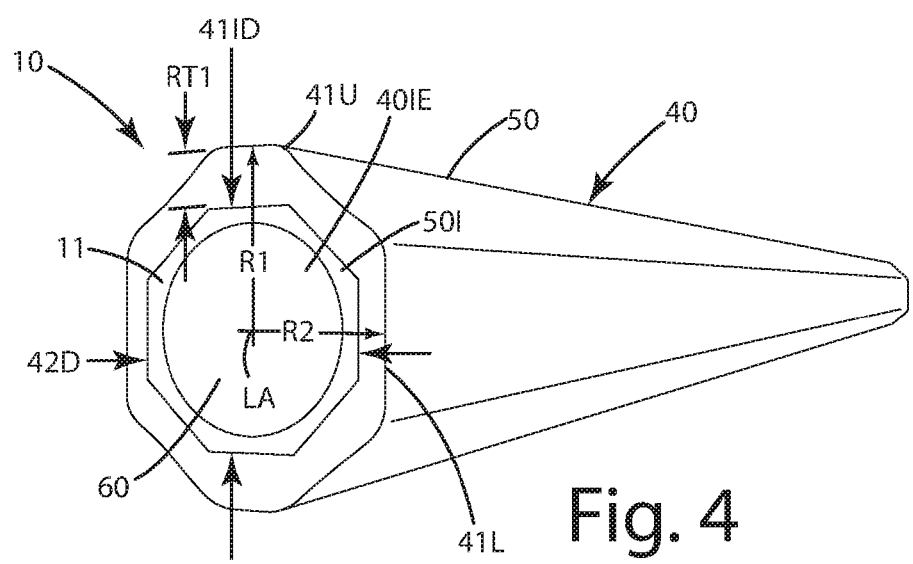
FIG. 4 is a section view of the composite lacrosse handle taken along lines 4-4 of FIG. 1.
Figure 5:
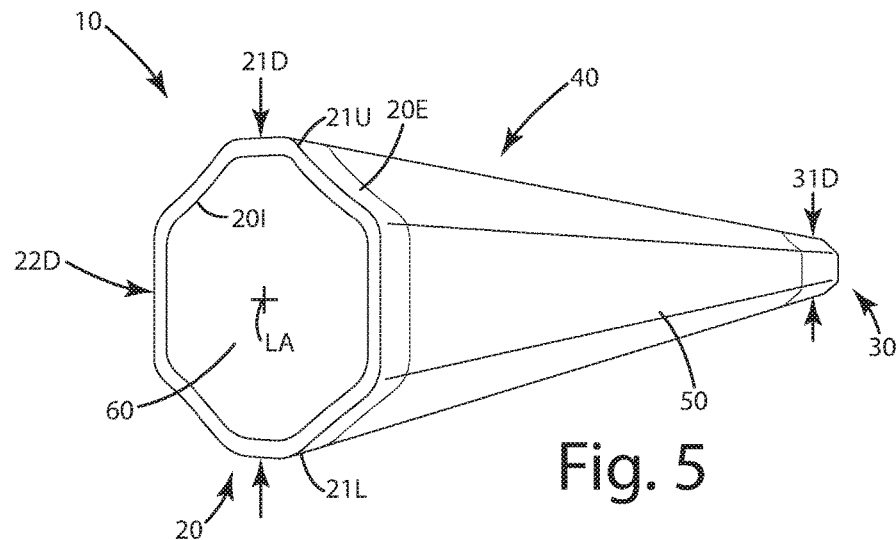
FIG. 5 is a section view of the composite lacrosse handle taken along lines 5-5 of FIG. 1.

A composite lacrosse handle of a current embodiment is shown in FIGS. 1-5 and generally designated 10. The handle 10 can include a first or top end 20 which is generally configured to join with a lacrosse head H. The lacrosse head H can be any conventional lacrosse head, for example, those offered by Warrior Sports Inc. of Warren, Mich. The handle 10 further includes a second or bottom end 30 located distal from the first or top end 20. Between the top end 20 and the bottom end 30, an intermediate portion 40 is disposed. The intermediate portion 40 can include a unitary overmolded cover 50 that is physically secured to and physically molded to the intermediate portion 40 of the handle as described further below. As shown in FIGS. 1, 2 and 5, one or both of the top 20 and bottom 30 ends of the handle, and in particular, the composite material from which they are constructed, can be exteriorly exposed so that the overmold cover 50 does not extend around or cover those top and bottom ends.

The bottom end 30 can be configured to receive a butt end of a lacrosse handle, also referred to as an endo. In some cases, the bottom end 30 can be deleted from the construction and the intermediate portion 40 can extend all the way to the end, opposite the top end 20. In such a case, the contour of the intermediate portion 40 can extend all the way to the second end. In other cases, the intermediate portion 40 and/or the cover 50 can extend all the way to the top end, so that no portion of the composite handle is viewable at that top end and the same is concealed by the overmolded cover.

Turning to FIG. 2, the composite lacrosse handle 10 can be formed so that the top end 20 is of a first length 20L, the bottom end 30 is of a second length 30L and the intermediate portion 40 is of a third length 40L. The first length 20L can be greater than the second length 30L or optionally equal thereto. The intermediate portion 40 can be of a length 40L which is greater than the first length 20L, and which can be greater than the second length 30L. The length 40L of the intermediate portion 40, and optionally the overmolded cover 50, can be a majority of the overall length of the composite lacrosse handle 10.

Optionally, the overmold cover 50 can extend along the entire intermediate portion 40. In such a case, the overmold cover can extend the same distance along the shaft's length as the intermediate portion. In some cases, the overmold can extend along a majority of the lacrosse handle. In other cases, the overmold cover can extend greater than 50% of the overall length of the shaft of the lacrosse handle body 11.

Further, the composite shaft as shown in FIG. 5 also can define a core 60. This core 60, as shown in the top end 20, can be of an octagonal shape, the core can transition to other shapes, for example a circular shape. The core can be an elongated void so that the composite handle forms a hollow tube having one or more internal diameters or dimensions.

Returning to the embodiment shown in FIGS. 1-5, the top and bottom ends 20 and 30 can define a first outer diameter 21D and a second outer diameter 31D. As used herein, a diameter is a straight line passing from side to side through a center of a body or figure. A diameter does not require that the associated cross section or shape be a circle or sphere, although diameters of those items are considered diameters as well. As shown in FIG. 5, the diameter 21D generally passes through the center or longitudinal axis LA of the composite lacrosse handle 10, which has a cross sectional shape of an octagon. Likewise, the second diameter 41ID also passes through the center of the cross section as shown in FIG. 3.

Optionally, the diameter 21D is taken from the uppermost surface 21U of the composite lacrosse handle 10 to the lowermost surface 21L, generally perpendicular to the longitudinal axis LA as shown in FIG. 5. Of course, other diameters are present in the cross section as shown in FIG. 5. For example, the lacrosse handle 10 can also include a lateral diameter 22D, which extends laterally across the width of the lacrosse handle, generally perpendicular to the diameter 21D. This second diameter 22D can be less than the first diameter 21D, depending on the particular configuration of the handle.

The diameter 21D and diameter 22D of the top end 20 can be uniform and consistent from the outermost tip 20T of the top end 20 to the beginning of the first interface 401 where the top end 20 meets the intermediate portion 40. As illustrated, the cross section can be of a generally octagonal shape. Of course, other shapes can be used, such as elliptical, round or other polygonal shapes for the cross section. At the first interface 401 as shown in FIG. 2, the exterior surface 20E of the top end 20 becomes concealed by the overmold cover 50. In this region, the composite shaft or handle 10 also begins to decrease in diameter. For example, comparing FIGS. 4 and 5, the octagonal shape of the composite handle body 11 begins to reduce in diameter. As shown in FIG. 4, the interface diameter 41ID is less than the top end diameter 21D. Likewise, the lateral diameter 42D is less than the top end lateral diameter 22D.

In this region, the core 60 also can change in shape. For example, in FIG. 5, the core is generally of an octagonal shape. In FIG. 4, in the interface region 401, the core diminishes and transitions to an elliptical, round or circular configuration at its outermost boundaries.

Optionally, in the interface region 401, the overmold cover 50 can define a radial thickness that varies about a circumference of the cover as shown in FIG. 4. For example, along a radius R1 taken through the longitudinal axis LA, the radial thickness between the upper exterior surface 41U and the interface region exterior 40IE can be RT1. This radial thickness RT1 can vary about the circumference, that is, the outer surface circling the longitudinal axis or generally transitioning around the longitudinal axis. As used herein, a circumference need require that the cross section of the shaft be a circle. The overmolded cover 50 can include a second radial thickness RT2 taken along a radius R2 that passes through the longitudinal axis LA of the composite lacrosse handle. This radial thickness RT2 can be less than the radial thickness RT1. In some cases, thickness RT1 can be optionally ¼ to ¾ the thickness RT1, and further optionally, about ¼ to ½ the thickness RT1. Of course, other thicknesses can be implemented, depending on the particular application. In this region, it is noted that the interior surface 501 of the overmolded cover is integrally bonded and molded to the exterior 40IE of the composite lacrosse handle body 11.

The top end 20 further transitions to the intermediate portion 40 as shown in connection with FIGS. 2 and 3. The composite lacrosse handle body 11 becomes reduced in diameter even more within the intermediate portion 40. The lacrosse handle 11 also can include a constant diameter 40D along the intermediate portion 40 and more particularly within the central region 40C of the intermediate portion 40. This diameter 40D can be less than the first and second outer diameters 21D and 22D shown in FIG. 5 of the top end, as well as the diameters 41ID and 42D in the interface portion 401 as shown in FIG. 4.

The central region 40C of the intermediate portion 40 can be of a circular cross section as illustrated in FIG. 3. Thus, the central region 40C can be in the form of a cylindrical tube having a wall thickness TW that is constant along the length of the central region 40C. This tube also can include the core 60 which, as illustrated, can be hollow, but of course, it can be selectively filled with a foam or other material.

The exterior surface 40CE of the central region 40C can be of a circular cross section as illustrated in FIG. 3. This exterior surface 40CE can be physically bonded to the interior surface of the overmold cover 50. Accordingly, the interior surface of the overmolded cover in the central region 40C also can be substantially circular in cross section. The exterior 50E of the overmold cover 50, however, can define an octagonal cross section, again as illustrated in FIG. 3. Thus, in this construction, the interior of the overmold cover includes a generally circular interior surface abutting and bonded to the exterior surface 40CE of the central region 40C; however, the exterior surface 50E in this same region is octagonal.

Optionally, the radial thickness of the overmold cover 50 in the central region 40C also can vary. For example, as shown in FIG. 3, along radii emanating from the longitudinal axis LA, the overmold cover 50 can have a first radial thickness RT3, a second radial thickness RT4 and a third radial thickness RT5. These radial thicknesses can be different from those radial thicknesses RT1 and RT2 of FIG. 4. They also can differ amongst themselves, with RT5 being greater than RT4, and RT4 being greater than RT3. Of course, these thicknesses can vary in other orders, depending on the particular application and the desired exterior profile of the exterior surface 50E. Further optionally, the cylindrical tube in the central region 40C can include an inner diameter of about 0.425 inches and an outer diameter of about 0.625 inches. Of course, other diameters can be selected, depending on the particular application.

As shown in FIG. 2, the central region 40C of the intermediate portion 40 transitions to a second interface 301, which then transitions to the bottom end 30. The second interface 301 can be similar to the interface 401 but simply reversed in transitioning to the bottom end 30. In some cases, the bottom end 30 can be of different geometric shapes along its exterior, in which case, the interface 301 can reflect this and can be configured differently. As mentioned above, the bottom end 30, and in particular the exterior of the shaft in this region, can be fully exposed, and not covered by the overmold cover. Of course, in some cases, it can be covered by a thin skin of the overmold cover if desired.

Generally, the bottom end 30 terminates at an opening 32 as shown in FIG. 2. This opening can be filled with a plug, endo or other device to improve handling of the lacrosse handle.

As mentioned above, the composite lacrosse handle 10 includes an overmold cover 50 in the intermediate portion 40. This overmold cover 50 can include an exterior surface 50E that transitions smoothly to and is flush with the top end exterior surface 20E as shown in FIG. 5, and/or the bottom end exterior surface 30E as shown in FIG. 2. In this transition, there optionally can be no perceivable difference, other than the texture and feel, between the material from which the overmold cover 50 is made, and the exterior surfaces of the composite lacrosse handle body. The material from which the overmolded cover is constructed can be any variety of materials, for example, rubber, silicone gel, EVA foam, or other materials.

In the current embodiment, the cover 50 optionally can be constructed from a viscoelastic material and/or thermoplastic elastomers (TPEs) that are physically bonded and/or molded directly to the exterior of the composite lacrosse body in the intermediate portion. Viscoelastic materials can be used to isolate vibration, absorb shock and dampen noise caused by impact of the lacrosse handle with other objects. The viscoelastic material can be any highly dampening viscoelastic polymeric solid that flows like a liquid under load or impact. Generally, the material can reduce vibration without being negatively impacted by temperatures at the extremes. Some suitable, exemplary viscoelastic materials are offered under the trade names: Sorbothane®, available from Sorbothane Inc. of Kent, Ohio; Implus®, available from Implus Corp. of Durham, N.C.; and Noene®, available from Noene USA, LLC. The thermoplastic elastomers can be any polymeric material that is a copolymer or a physical mix of polymers (usually a plastic and a rubber) which include materials with both thermoplastic and elastomeric properties. The TPEs can be used to add a soft feel, to absorb shock, to improve grip and the like. Some suitable, exemplary TPEs are offered under the trade names: Santoprene® thermoplastic vulcanizates, available from ExxonMobil of Spring, Tex.; Hytrel®, available from DuPont USA of Wilmington, Del.; Kraton®, available from Kraton Performance Polymers, Inc. of Houston, Tex.; and Engage® polyolefin elastomers available from Dow Chemical of Midland, Mich.

A method for making the composite lacrosse handle 10 will now be described with reference to FIGS. 6-10. To construct the handle 10, first and second mandrels 80 and 90 can be utilized. These mandrels can include both enlarged ends and narrowed ends. For example, with reference to FIG. 6, the first mandrel 80 includes an enlarged end 81 and a narrowed end 82. The second mandrel 90 includes an enlarged end 91 and a narrowed end 92. The enlarged ends 81 and 91 can correspond to the interior surfaces of the top 20 and bottom 30 ends of the lacrosse handle. For example, as shown in FIG. 5, the exterior surface 81E of the mandrel 80 can correspond to the interior surface 201 of the top end. Indeed, this mandrel can form that particular interior surface 201. The mandrels can each include transition region 83 and 93, which generally correspond to the interface regions 401 and 301, respectively, of the lacrosse handle body 11. The narrowed ends 82 and 92 of the respective first and second mandrels 80 and 90 can include exterior surfaces 82E and 92E that correspond to the interior surface 40CI (FIG. 3) of the intermediate portion 40. These narrowed ends 82 and 92 can be cylindrical and can terminate at terminal ends 85 and 95.

Optionally, the terminal ends can be structured so as to enable the two opposing mandrels to securely join with one another during a molding process. For example, the terminal end 85 can be a threaded male fitting, and the terminal end 95 can define a correspondingly threaded female bore. When the narrowed ends are brought together, the threaded male fitting and/or one or both of the terminal ends, can be rotated and thus thread the male fitting into the female portion to secure the ends of the mandrels to one another in a fixed manner. This can be referred to as a screw type mandrel attachment. As another example, the terminal end 85 can include a male connector, optionally tapered, that slip fits within a corresponding female connector or bore defined in the terminal end 95. When the narrowed ends are brought together, the male fitting simply slides or slips into the female connector to secure the ends of the mandrels to one another. This can be referred to as a slip fit mandrel attachment. Other types of mechanisms and structures are contemplated to secure the narrowed ends of the opposing mandrels to one another.

Figure 6:
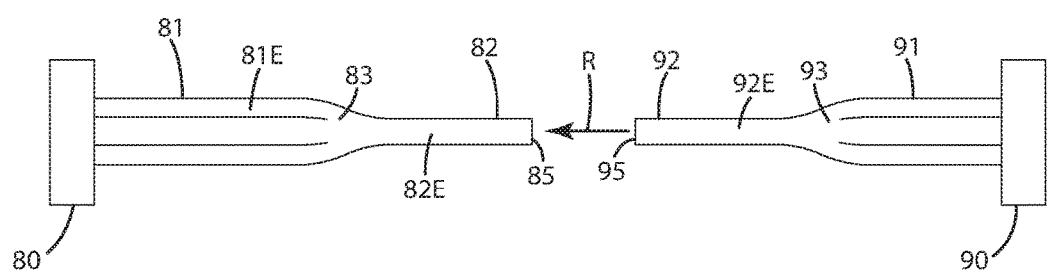
FIG. 6 is a side view of mandrels used to form the lacrosse handle.
Figure 7:
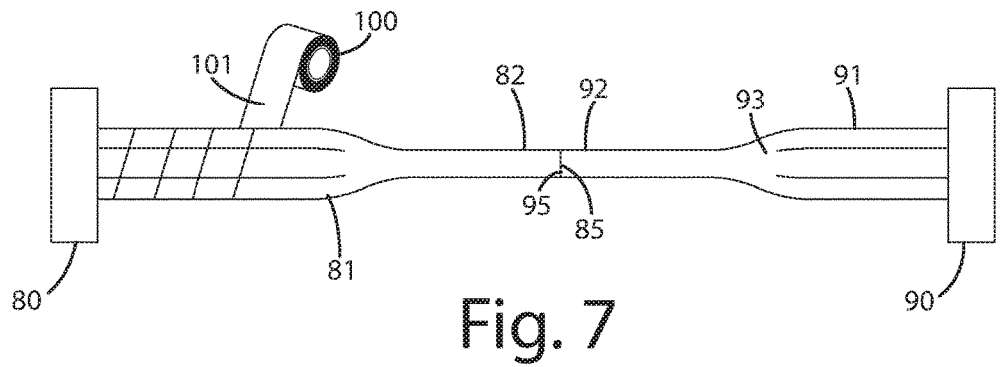
FIG. 7 is a side view of the mandrels abutting one another and a fiber reinforced material being applied to the mandrels to form an uncured lacrosse handle.

Generally, the method includes bringing the narrowed ends 82 and 92 of the respective mandrels 80 and 90 toward one another in the direction R as shown in FIG. 6. When these mandrels are brought toward one another in direction R, they can eventually abut or become substantially adjacent one another, for example, within about ¼ to ¹⁄₃₂ of an inch from one another. Optionally, there can be no gap disposed between the mandrel terminal ends 85 and 95 when abutted against each other as shown in FIG. 7. Further optionally, where the terminal ends include a screw type mandrel attachment, one or both of the mandrel ends can be rotated to threadably engage the other end and secure the mandrels fixedly to one another. Even further optionally, where the terminal ends include a slip fit mandrel attachment, one or both of the mandrel ends can be fit within the end of the other mandrel end to secure the mandrels fixedly to one another.

In the foregoing configurations, the mandrels are ready to be applied with a material. This material can be in the form of a roll 100 of any elongated strip 101 of the fiber reinforced material. This fiber reinforced material optionally can be fiber reinforced plies of aromatic polyamide fibers, carbon fibers, fiberglass fibers and/or combinations thereof. The strip of material 101 is wrapped continuously around the respective first and second mandrels 80 and 90 in the shape of the body 11 of the lacrosse handle. The strip of material 101 also bridges the region where the terminal ends 85 and 95 of the respective mandrels engage and/or abut one another. Indeed, in this location, a strip can be disposed on both the narrowed end 82 and simultaneously the narrowed end 92, thereby bridging the mandrels. The material 100 can be wrapped in multiple plies around the mandrels. If desired, additional sheets or strips can be laid in particular regions or areas to provide additional reinforcement or additional surface contours, depending on the application.

Figure 8:
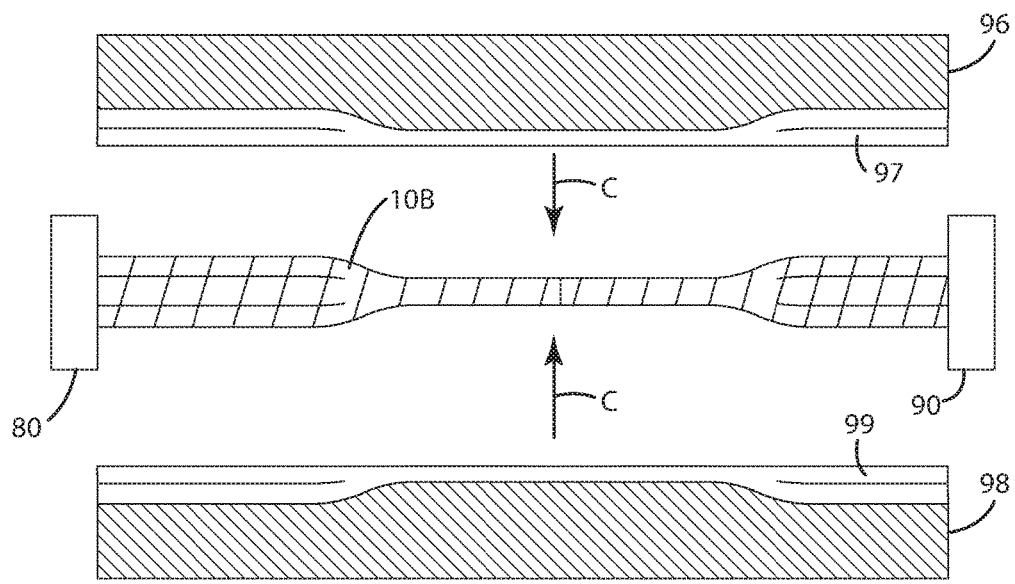
FIG. 8 is a side view of the uncured lacrosse handle being placed in a mold cavity having an exterior shape of the lacrosse handle.
Figure 9:
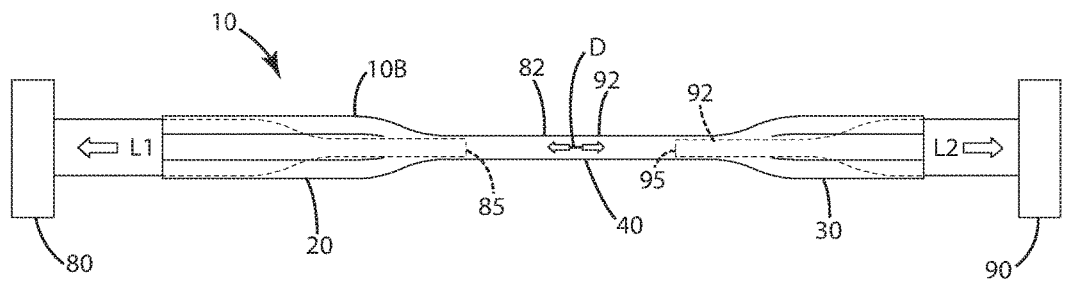
FIG. 9 is a side view of mandrels being withdrawn from a cured composite lacrosse handle.

After the mandrels 80 and 90 have been wrapped as shown in FIG. 8, an uncured lacrosse shaft or body 10B is generally disposed on those mandrels both on the first and second enlarged ends as well as the first and second narrowed ends. As shown in FIG. 8, mold parts 96 and 98 are moved in direction C toward the uncured lacrosse shaft and/or lacrosse shaft body 10B. These mold parts 96 and 98 include mold cavities 97 and 99 which correspond to the exterior surfaces 20E, 401E, 301E, 40CE and 30E as illustrated in FIG. 2 of the lacrosse handle body 11. Generally, these mold cavities correspond to the top end, intermediate portion and bottom end of the lacrosse handle body. Heat and pressure are applied via the mold parts 96 and 98 when they are closed against the mandrels 80 and 90 to form and cure the fiber reinforced material within the mold cavity. This, in turn, produces a cured lacrosse shaft 10 as shown in FIG. 9 and in particular, lacrosse shaft body 10B. This lacrosse shaft body 10B can include the top end 20, intermediate portion 40 and bottom end 30.

Due to the reduced dimension of the intermediate portion 40, the mandrels 80 and 90 are separated or moved away from one another to remove them from the lacrosse handle. In particular, the terminal ends 85 and 95 of the narrowed ends 82 and 92 are withdrawn from the intermediate portion 40. In this step, the exterior surfaces of the mandrels detach, slide and/or move relative to the interior surfaces of the lacrosse shaft body B. The narrowed ends 82 and 92 in this step also move away from one another in a direction D as shown in FIG. 9. The mandrels can be removed substantially from the newly formed core 60 of the lacrosse handle 10. Generally, the mandrels 80 and 90 move in opposite longitudinal directions L1 and L2 during this step.

Figure 10:
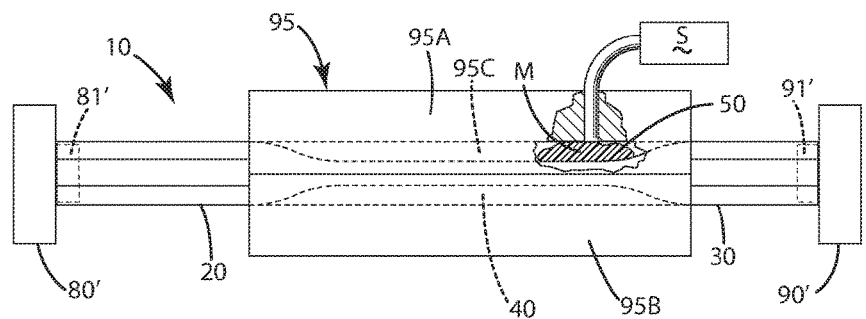
FIG. 10 is a side view of the composite lacrosse handle being placed in a second mold to overmold a cover material within a reduced dimension contour of the handle.

The overmold cover 50 can be overmolded over the intermediate portion 40 of the composite lacrosse handle 10 as shown in FIG. 10. This can be performed by overmolding that portion with a material, such as a viscoelastic material, but not overmolding the top end 20 and bottom end 30 of the composite lacrosse handle 10. In such a case, the top and bottom ends remain exteriorly opposed, apart from and visibly distinguished from the viscoelastic material. The overmolding of the material forming the overmold cover 50 can be performed before or after the first and second mandrels are removed from the lacrosse shaft.

As shown in FIG. 10, the composite lacrosse handle 10, already having been cured, can be placed on secondary mandrels 80' and 90', which include small projections 81' and 91'. The small projections can correspond to the interior of the cured composite lacrosse handle 10, without extending substantially into the core 60. Of course, in other cases, the mandrels 80 and 90 can remain inside the composite lacrosse shaft and a second mold can be placed over any portion to form the overmold cover 50.

Returning the FIG. 10, there, a second mold 95 can be placed over the intermediate portion 40. This second mold 95 can include a first part 95A and a second part 95B that generally circumferentiate and/or enclose the intermediate portion 40. A cavity 95C is defined around the intermediate portion 40. This cavity can correspond to the exterior surface 50E of the overmold cover 50 when it is formed. A material M is provided from a source S and injected into the cavity 95C. This material is allowed to cure, physically bond and mold directly to the outer surface of the intermediate portion 40. This forms a mechanical and chemical bond between the material and the exterior surface of the lacrosse handle 10 in this region.

After the material cures, the parts 95A and 95B of the mold 95 are removed from the handle 10 and the handle 10 is removed from the projections 80' and 90'. The viscoelastic material and/or lacrosse shaft at that point can be trimmed, sanded, polished or can undergo other processing to ready it for further packaging and/or distribution.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method for manufacturing a composite lacrosse handle comprising:
providing a first mandrel including a first enlarged end that narrows toward a first narrowed end,
providing a second mandrel including a second enlarged end that narrows toward a second narrowed end;
contacting the first narrowed end with the second narrowed end;
applying a fiber-reinforced material over both the first and second mandrels to form an uncured lacrosse shaft;
placing the uncured lacrosse shaft within a mold cavity having the exterior shape of a cured lacrosse shaft;
curing the fiber-reinforced material within the mold cavity to provide a cured lacrosse shaft having a top end adapted to attach to a lacrosse head, a bottom end opposite the top end, and a narrowed intermediate portion therebetween;
overmolding the narrowed intermediate portion of the cured lacrosse shaft with at least one of a viscoelastic material and a thermoplastic elastomer, wherein the top and bottom ends of the cured lacrosse shaft are exteriorly exposed apart from the at least one of a viscoelastic material and a thermoplastic elastomer; and
removing the first and second mandrels from the interior of the cured lacrosse shaft to define a hollow core extending longitudinally therethrough.

2. The method of claim 1 wherein the removing the first and second mandrels from the interior of the cured lacrosse shaft is performed after the overmolding.

3. The method of claim 1 wherein the removing the first and second mandrels from the interior of the cured lacrosse shaft is performed before the overmolding.

4. The method of claim 1 wherein the contacting includes threadably engaging the first narrowed end with the second narrowed end.

5. The method of claim 1 comprising forming the narrowed intermediate portion to include a tapered transition to the top and bottom ends.

6. The method of claim 1 comprising defining in the at least one of a viscoelastic material and a thermoplastic elastomer a radial thickness that varies about a circumference of the lacrosse handle.

7. The method of claim 6 comprising alternating the radial thickness between a first radial thickness and a second radial thickness.

8. The method of claim 1 wherein the fiber-reinforced material includes at least one of aromatic polyamide fibers, carbon fibers, fiberglass fibers and combinations thereof.

9. The method of claim 1 comprising forming a solid foam core within the hollow core of the cured lacrosse shaft.

10. The method of claim 1, comprising:
providing a length of the shaft; and
extending the viscoelastic material along greater than fifty percent of the length of the shaft.

11. The method of claim 1 wherein the contacting includes slip fitting a part of the first narrowed end inside the second narrowed end.

12. A method of manufacturing a composite lacrosse handle comprising:
providing a first mandrel including a first enlarged end that narrows toward an opposing first narrowed end,
providing a second mandrel including a second enlarged end that narrows toward an opposing second narrowed end;
placing the first narrowed end and second narrowed end adjacent and contacting one another;
molding a fiber-reinforced material in a first mold adjacent the first mandrel and adjacent the second mandrel to form an uncured lacrosse shaft;
curing the uncured lacrosse shaft to form a cured lacrosse shaft having a narrowed intermediate portion between opposing top and bottom ends, the top end being adjacent the first enlarged end, the bottom end being adjacent the second enlarged end;
overmolding in a second mold the narrowed intermediate portion, but not the top and bottom ends, with at least one of a viscoelastic material and a thermoplastic elastomer; and
removing the first and second mandrels from the cured lacrosse head to define a hollow core extending longitudinally therethrough.

13. The method of claim 12 wherein the removing step is performed before the overmolding step.

14. The method of claim 12 wherein the first and second mandrels are moved longitudinally away from one another along a longitudinal axis during the removing step.

15. The method of claim 14 wherein the overmolding step produces an overmold cover including an inner surface defining a circular cross section and an outer surface defining an octagonal cross section.

16. The method of claim 15 wherein the overmold cover extends, along greater than fifty percent of a length of the cured lacrosse shaft.

17. The method of claim 1 wherein one of the first narrowed end and the second narrowed end includes a threaded male fitting, and the other of the first narrowed end and the second narrowed end includes a corresponding threaded female bore,
wherein the contacting includes threaded engagement such that the first narrowed end and the second narrowed are removably and threadably joined.

18. The method of claim 12 wherein one of the first narrowed end and the second narrowed end includes a threaded male fitting, and the other of the first narrowed end and the second narrowed end includes a corresponding threaded female bore,
wherein the contacting includes threaded engagement such that the first narrowed end and the second narrowed are removably and threadably joined.

19. The method of claim 12 wherein the contacting includes threadably joining the first narrowed end and the second narrowed end.

20. The method of claim 12 wherein the contacting includes slip fitting a part of the first narrowed end inside the second narrowed end.

* * * * *